TJISKE DOUMA
INVENTOR
BY [signature]
AGENT

UNITED STATES PATENT OFFICE 2,617,027

PULSE-TIME DEMODULATOR

Tjiske Douma, Eindhoven, Netherlands, assignor to Hartford National Bank and Trust Company, Hartford, Conn., as trustee Application November 22, 1946, Serial No. 711,676
In the Netherlands September 28, 1945

Section 1, Public Law 690, August 8, 1946
Patent expires September 28, 1965

5 Claims. (Cl. 250—27)

Figures 1A, 1B, 1C, 1D:
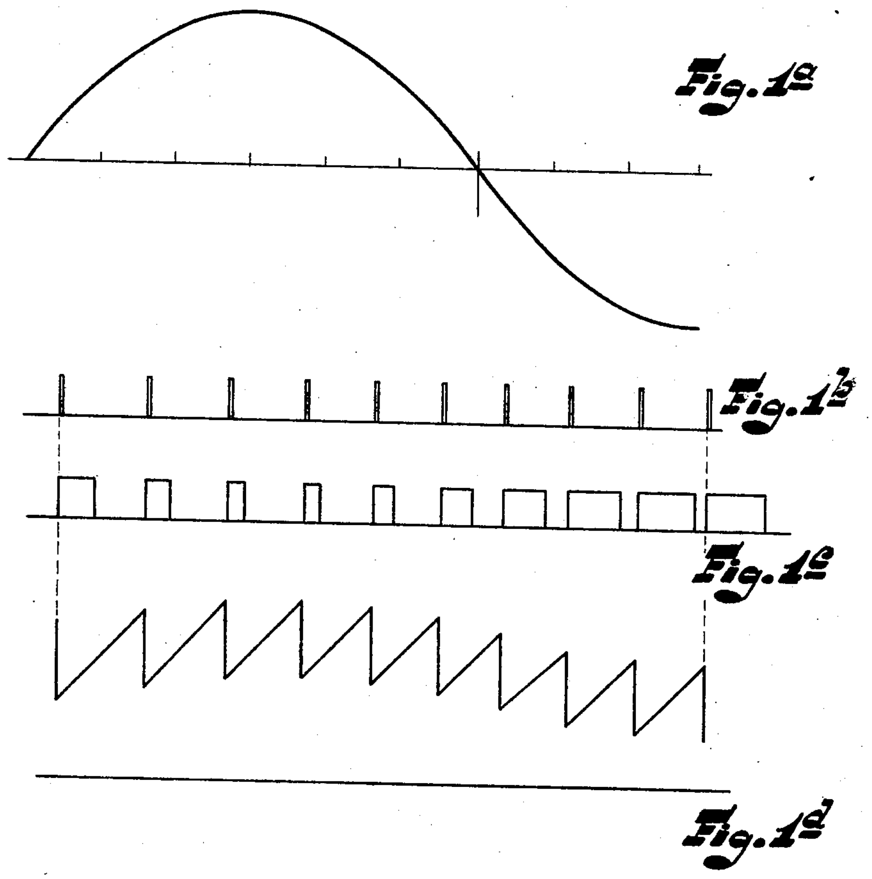

For the transmission of signals by means of a modulated carrier oscillation it is known to make use of so-called impulse-modulation, more particularly of impulse-phase modulation. In this method of modulation the carrier oscillation is modulated by impulses which are short with respect to their relative distance and the relative distance of which varies in accordance with the instantaneous value of the amplitude of a signal to be transmitted. More particularly with impulse-phase modulation the average number of impulses per time unit (referred to as fundamental frequency) is constant and the time difference between the moment at which the impulses occur and would occur in a non-modulated state is proportional to the instantaneous value of the amplitude of the signal to be reproduced.

On the receiver side the impulses thus transmitted are supplied, after detection, to a device by which these impulses modulated by the signal to be reproduced are converted into amplitude variations corresponding with the signal transmitted.

In the conventional receivers the conversion of impulse-phase modulation into amplitude variations takes place by adding identical impulses having the fundamental frequency of the incoming impulses (timing impulses) to the signal pulses and by supplying them jointly to a device having two positions of equilibrium and passing in any instance, on reception of the first of two succeeding impulses, from one position of equilibrium to the other and on reception of the next impulse from the latter position again to the first. In this way impulses, the frequency of which is constant, but of a longer duration which varies with the instantaneous value of the amplitude of the signal to be reproduced, appear in the output circuit of the said device since two succeeding impulses which control the device will always consist of a timing pulse and a signal pulse, the relative distance between these pulses depending upon the instantaneous value of the amplitude of the signal to be transmitted. The broad impulses thus formed having a constant frequency and variable duration are then put together with the result that, after selecting the impulse frequency, amplitude variations are obtained which correspond with the signal to be transmitted.

Consequently, the conventional receiving devices for impulse-phase modulation the reproduction of the transmitted signal require additional impulses (timing impulses) which either have to be transmitted modulated with the signal impulses on the carrier oscillation, or have to be produced on the receiver side.

The object of the invention is to procure a device for converting impulses having a variable relative distance into amplitude variations, in which timing impulses can be dispensed with.

According to the invention this is achieved by converting the impulses into a sawtooth-current or -voltage in such a manner that the time during which the current or voltage varies in a definite direction depends on the distance between the impulses, whereas the time during which the sawtooth-current or -voltage varies in opposite direction is constant, the variation of the current or voltage during this constant time always being the same.

The conversion of the impulses into a sawtooth-current or -voltage is preferably effected by means of a non-self-sustaining oscillator producing a sawtooth-current or -voltage which is controlled by the impulses, in which during the time elapsing between two impulses a current or voltage varying in a definite direction is generated, the impulses bringing about a current or voltage variation in the opposite direction and expedients being provided by which the latter variations are made equal for each impulse.

In one executional example of the device according to the invention the impulses are supplied to a control grid of a screen-grid tube which is blocked between the appearance of two impulses, preferably a pentode, which is made conductive by the impulses.

Figure 2:
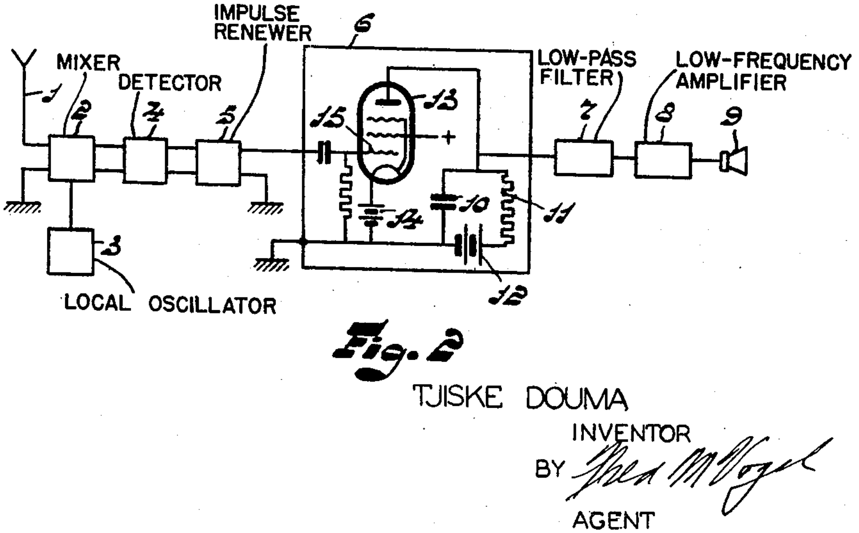

In order that the invention may be clearly understood and readily carried into effect, it will now be described more fully with reference to the accompanying drawing, in which Figs. 1*a*–1*d* represent curves serving to elucidate the idea underlying the invention, and Fig. 2 shows diagrammatically a receiving device for impulse-phase modulation in which use is made of a form of construction of a device according to the invention.

Fig. 1*a* shows a curve which represents part of the signal to be transmitted. The impulses to be used for this purpose are represented in Fig. 1*b*. The character of these impulses consists in that the average number of impulses per time unit is constant, but the phase of the impulses is proportional to the instantaneous value of the amplitude of the signal to be transmitted, in other words that the mean frequency of the impulses (fundamental frequency) is constant but the time difference between the moment at which the impulses appear and the moment at which they would appear in a non-modulated state, is proportional to the instantaneous value of the amplitude of the signal to be transmitted. The moment at which the impulses occur is consequently shifted in phase. Hence, this method of transmission is called impulse-phase modulation.

In the well-known devices for converting impulses having the character as shown in Fig. 1*b* into amplitude variations, the short impulses having a variable distance are converted into broad impulses having a constant frequency and a variable duration as shown in Fig. 1*c*; then the signal to be reproduced having a variable amplitude is derived from these impulses.

The invention, however, approaches the problem on entirely different lines. According thereto, the impulses shown in Fig. 1*b* are converted into a sawtooth-current or -voltage of the character shown in Fig. 1*d*. This character consists in that the time, during which the sawtooth voltage varies in a definite direction and increases in the present case, depends upon the distance between the impulses, whereas the time during which the sawtooth voltage varies in the opposite direction and decreases in the present case, is constant, the decrease during this time always being the same. As appears from Fig. 1*d* the value of the voltage, at the moments at which it reverses in direction, varies in accordance with the phase of the impulse which causes the change of direction at that moment. Thus an amplitude variation, the instantaneous value of which varies with the phase of the impulses provoking the changes of direction can be derived, as the case may be after selecting the fundamental frequency of the impulses, from a sawtooth voltage having the character referred to.

According to the curve shown in Fig. 1*d* the current or voltage increases during the lapse of time between two impulses, and decreases during the impulse.

It is obvious that the character of the sawtooth current or voltage does not change if, in contradistinction to Fig. 1*d*, the current or voltage decreases during the lapse of time between two impulses, and increases during the impulse.

In the form of construction of a receiver for impulse-phase modulation shown in Fig. 2 the carrier wave impulses picked up by an aerial 1 are supplied to a mixing stage 2 and converted, by means of the oscillations generated by a local oscillator 3, into an intermediate-frequency carrier oscillation modulated by impulses. This carrier oscillation is detected, as the case may be after amplification, in a detector 4 and the impulses, which appear in the output circuit of the detector and the character of which is shown in Fig. 1*b*, are supplied to a so-called impulse-renewer 5, in which the impulses obtained after detection are converted into new impulses having an amplitude and duration which are independent of interferences, if any. The detected impulses are preferably supplied, through a limiter to the impulse renewer, this limiter or the impulse-renewer itself having a threshold value, thus preventing interferences below the threshold value from producing an impulse in the output circuit of the impulse renewer 5.

The oscillations occurring in the output circuit of the impulse renewer 5 are supplied to a device 6 which converts the impulses having a variable time interval into a sawtooth voltage of the kind shown in Fig. 1*d*.

The sawtooth voltage appearing in the output circuit of the device 6 is preferably supplied through a low-pass filter 7, which halts the fundamental frequency of the impulses, and through a low-frequency amplifier 8 to a reproducing device, for example, a loudspeaker 9.

In the present form of construction the device 6 comprises a non-self-sustaining sawtooth oscillator consisting of a condenser 10 which is charged through a resistance 11 by a direct voltage supply 12 and is capable of discharging through a discharge tube 13 connected in parallel with the condenser. The grid of the tube 13 has supplied to it, for example from a source of potential 14, such a negative voltage that the tube is only conducting during the time in which an impulse appears at the grid 15 of the tube 13. The negative bias may also be obtained by correct proportioning of a grid condenser and a grid-leakage resistance. The charging time of the condenser is thus determined by the relative distance between the impulses, and the discharge time by the impulse duration. If the distance between the impulses supplied is constant, a sawtooth voltage having the fundamental frequency of the impulses supplied and having constant amplitude is set up across the condenser. If, however, the distance between the impulses varies in accordance with the instantaneous value of the amplitude of a signal to be transmitted, a voltage of the kind shown in Fig. 1*d* is obtained across the condenser and this voltage comprises the amplitude variations of the signal to be reproduced.

However, the curved form shown in Fig. 1*d* is only obtained if the decrease in condenser voltage during each discharge time is always the same. If this is not the case, a material distortion of the signal to be reproduced ensues.

In order to avoid this distortion, the tube 13 is constructed as a screen-grid tube, more particularly as a pentode, since such a tube has the property that above a definite value of the anode voltage connected with the grid voltage, the anode current is practically independent of the anode voltage. From this it follows that as long as the direct anode voltage of tube 13 exceeds the said voltage, the variation of the discharge curent of the condenser is steadily the same during each discharge period, independent of the value of the condenser voltage at the moment at which the impulses are supplied to the grid 15 of the tube 13, and since the discharge time is determined by the impulse duration and is consequently constant, the use of a pentode leads to the purpose aimed at viz. an equal decrease in condenser voltage per impulse.

To avoid distortion even with the largest amplitude of the signal to be reproduced, the direct anode voltage of tube 13 is chosen to be such that the minimum anode voltage occurring at the maximum amplitude of the signal to be reproduced, exceeds the value of the direct anode voltage, the anode current of the tube being independent of the anode voltage. As this value depends on the grid voltage, allowance has to be made for the amplitude of the impulses supplied to the grid. In the given form of construction the direct anode voltage is equal to the mean voltage occurring across the condenser 10. The value of this voltage is determined by the source of potential 12 and the impulses supplied to the grid 15.

According to the curve shown in Fig. 1*d* the voltage across the condenser 10 increases linearly with time during the interval between two impulses. If this is not the case, the condenser voltage, at the moment at which the impulses appear at the grid 15, is not only dependent on the interval between two impulses but also on the divergence from the linearity, which provokes a distortion of the signal reproduced.

In the sawtooth circuit hitherto described, in which the condenser 10 is charged through a resistance, the variation of the voltage set up across the condenser during the interval between two impulses is, as a rule, not exactly linear.

A measure which ensures a substantially linear variation of the side of the sawtooth voltage formed during the interval between two impulses consists in that the supply voltages of tube 19 are chosen to be such that the current variation through the resistance 11 is small relatively to the average current traversing the resistance 11.

The desired linear variation is, however, preferably ensured by replacing the resistance 11 by a screen-grid tube or pentode, with the result that, with a suitable choice of the supply voltages of this tube, the charging current of the condenser is practically constant, independent of the anode voltage. In order to obtain this result even with the largest amplitude of the signal to be reproduced, the supply voltages of the screen-grid tube are chosen to be such that the minimum anode voltage set up with a maximum amplitude of the signal to be reproduced exceeds the voltage at which the anode current is independent of the anode voltage.

In this respect it is pointed out that it is only necessary to derive the signal to be reproduced through a filter 7 from the voltage set up across the condenser 10 and having the character shown in Fig. 1*d*, if the fundamental frequency of the impulses supplied to the device 6 has such a value that it might give rise to interference upon reproduction. If, however, the fundamental frequency of the impulses falls out of the reproduction range of the loudspeaker or lies outside the audible frequency range, the voltage appearing in the output circuit of the device 6 and having a variable amplitude can be supplied to the loudspeaker 9 without the interposition of the filter 7.

Furthermore, it may be pointed out that the device 6 shown in Fig. 2 for producing a sawtooth voltage has to be considered only as one form of construction. According to the invention any other device for the production of a sawtooth current or voltage can be utilised for the conversion of impulses modulated by a signal to be reproduced into amplitude variations corresponding with this signal.

An impulse renewer 5 as included in the receiving cascade of the receiver shown in Fig. 2 is preferably used to enhance the freedom from interference of a receiver for impulse-phase modulation. This impulse renewer ensures the congruence of the impulses supplied to the device 6.

The described circuit for converting phase-modulated impulses into amplitude variations, in other words for the detection of phase-modulated impulses, may also be used for the detection of impulses modulated in frequency by a signal to be reproduced. In this modulation method the interval between the impulses is likewise dependent upon the instantaneous value of the amplitude of the signal to be reproduced, the divergence of the number of impulses per time unit, which would occur without modulation, being proportional to the instantaneous value of the amplitude of the signal.

However, when using the device according to the invention for the detection of impulses thus modulated it is necessary to connect a differentiating network in cascade with this device.

This may be explained as follows.

In the case of phase-modulated impulses the phase of the impulses is proportional to the instantaneous value of the amplitude of the signal to be reproduced. The time interval between succeeding impulses decreases with the time interval in the non-modulated state and is consequently proportional to the variation of the amplitude of the signal to be reproduced with the time and consequently with the first derivative therefrom according to time. If such a signal is supplied to the device 6 shown in Fig. 2, the value of the voltage at the moments, at which it reverses its direction, varies proportionally to the phase of the impulses and consequently to the instantaneous value of the amplitude of the signal to be reproduced.

In the case of frequency-modulated impulses the divergence from the frequency in the non-moulated state is proportional to the instantaneous value of the amplitude of the signal to be reproduced. The interval between the impulses is thus a measure of the instantaneous value of the signal amplitude and not, as in the case of impulse-phase modulation, of the first derivative therefrom. If these impulses are supplied to the device 6 in Fig. 2, the value of the voltage at the moments at which it reverses its direction, which voltage is proportional to the phase of the impulses, is proportional to the integral of the instantaneous value of the amplitude of the signal to be reproduced. Therefore, a differentiating network is required to procure a voltage which is proportional to the instantaneous value of the amplitude of the signal.

The cascade circuit of a device according to the invention and of a differentiating network in a receiver for impulse-frequency modulation is preferably used for converting the impulses, obtained after detection, into amplitude variations of the signal to be reproduced.

In conclusion it may be observed that the device according to the invention is, in general, suitable for converting impulses, which are short with respect to the interval between them and which interval varies in accordance with the instantaneous value of the amplitude of a signal to be reproduced, into amplitude variations corresponding with this signal.

If the relative distance is a measure of the variation of the instantaneous value of the amplitude, as is the case with impulse-phase modulation, the device according to the invention is serviceable without the need for other means. If the relative distance is a measure of the instantaneous value of the amplitude, as is the case with impulse-frequeny modulation, a differentiating network has to be connected in cascade. It is further self-explanatory that if use is made of the device according to the invention in modulation methods being a combination of the aforesaid methods or in which the relative distance between the impulses has another relationship with the signal to be transmitted, a network particularly adapted to each case must be employed.

What I claim is:

1. An electrical circuit arrangement for producing an output potential having amplitude variations proportional to the time interval between successive pulses of a plurality of recurring impulses of constant duration applied thereto comprising means to produce a sawtooth wave having a leading edge whose slope is substantially constant and a trailing edge, means responsive to the interval between succeeding impulses to vary the length of one of said edges in proportion thereto, and means responsive to the duration of said impulses to maintain the other of said edges of constant length.

2. An arrangement as set forth in claim 1, further including a filter means coupled to said sawtooth producing means for deriving said output potential from said sawtooth wave and for attenuating the sawtooth components of said wave.

3. An arrangement as set forth in claim 1 wherein said means to produce a sawtooth wave includes a capacitor, a resistor and means to charge said resistor through said capacitor.

4. An arrangement as set forth in claim 3 wherein said means responsive to the duration of said impulses to maintain the other of said edges of constant length includes an electron discharge tube having a cathode, a control grid and an anode, means connecting said cathode and said anode to said capacitor to provide a discharge path therefor through said tube, and means to apply said constant duration impulses to said control grid to render said tube operative for a period discharging said capacitor to an extent proportional to said impulse duration.

5. An arrangement as set forth in claim 4 wherein said tube further includes a screen grid means to apply operating potentials to the electrodes of said tube at which the anode current of the tube is substantially independent of anode voltage.

TJISKE DOUMA.

REFERENCES CITED

The following references are of record in the file of this patent:

UNITED STATES PATENTS

| Number | Name | Date |
|---|---|---|
| 2,188,653 | Faudell | Jan. 30, 1940 |
| 2,191,185 | Wolff | Feb. 20, 1940 |
| 2,262,407 | Rath | Nov. 11, 1941 |
| 2,274,184 | Bach | Feb. 24, 1942 |
| 2,299,252 | Pierce | Oct. 20, 1942 |
| 2,362,503 | Scott | Nov. 14, 1944 |
| 2,391,776 | Fredendall | Dec. 25, 1945 |
| 2,416,305 | Grieg | Feb. 25, 1947 |
| 2,416,306 | Grieg | Feb. 27, 1947 |
| 2,557,038 | Ross | June 12, 1951 |